(12) United States Patent
Endtner et al.

(10) Patent No.: US 9,908,997 B2
(45) Date of Patent: Mar. 6, 2018

(54) POLYAMIDE COMPOSITIONS

(71) Applicant: LANXESS Deutschland GmbH, Cologne (DE)

(72) Inventors: Jochen Endtner, Cologne (DE); Matthias Bienmueller, Krefeld (DE); Fabio Passeri, Albiolo (IT)

(73) Assignee: LANXESS DEUTSCHLAND GMBH, Cologne (DE)

( * ) Notice: Subject to any disclaimer, the term of this patent is extended or adjusted under 35 U.S.C. 154(b) by 147 days.

(21) Appl. No.: 14/669,039

(22) Filed: Mar. 26, 2015

(65) Prior Publication Data
US 2015/0274940 A1 Oct. 1, 2015

(30) Foreign Application Priority Data
Mar. 26, 2014 (EP) .................... 14161762

(51) Int. Cl.
| | |
|---|---|
| *C08K 13/02* | (2006.01) |
| *C08K 5/3492* | (2006.01) |
| *C08K 7/14* | (2006.01) |
| *C08K 9/06* | (2006.01) |
| *C08K 3/22* | (2006.01) |
| *H01H 3/00* | (2006.01) |

(52) U.S. Cl.
CPC .............. *C08K 13/02* (2013.01); *C08K 3/22* (2013.01); *C08K 5/34924* (2013.01); *C08K 7/14* (2013.01); *C08K 9/06* (2013.01); *H01H 3/00* (2013.01); *C08K 2003/2241* (2013.01); *C08K 2201/004* (2013.01); *C08K 2201/005* (2013.01)

(58) Field of Classification Search
CPC . C08L 77/06; C08L 77/02; C08L 7/00; C08K 7/14; C08K 5/34924
See application file for complete search history.

(56) References Cited

U.S. PATENT DOCUMENTS

| | | |
|---|---|---|
| 3,644,574 A | 2/1972 | Jackson, Jr. et al. |
| 4,806,593 A | 2/1989 | Kress et al. |
| 4,812,515 A | 3/1989 | Kress et al. |
| 4,859,740 A | 8/1989 | Damrath et al. |
| 4,861,831 A | 8/1989 | Damrath et al. |
| 4,937,285 A | 1/1990 | Wittmann et al. |
| 9,050,843 B2 | 6/2015 | Duijnhoven Van et al. |
| 2007/0072967 A1 | 3/2007 | Nass et al. |
| 2009/0264562 A1* | 10/2009 | Schellekens ......... C08K 5/0008 524/101 |
| 2012/0165439 A1* | 6/2012 | Endtner .................. C08K 3/40 524/101 |
| 2013/0092226 A1 | 4/2013 | Pawlik et al. |

FOREIGN PATENT DOCUMENTS

| | | |
|---|---|---|
| CN | 103013104 A | 6/2015 |
| DE | 4236122 A1 | 4/1994 |
| GB | 1409275 | 10/1975 |

OTHER PUBLICATIONS

Etzler, Frank M., et al., "Particle Size Analysius: a comparison of Various Methods II", Part. Part. Syst. Charact. 14 (1997) Wiley-VCH Verlag GmbH, Weinheim, Germany, pp. 278-282.
European Search Report from European Application No. 14161762, dated Sep. 30, 2014, two pages.
Database WPI, Week 201403, Thomson Scientific, London, GB, XP002730437.

* cited by examiner

*Primary Examiner* — Bijan Ahvazi
*Assistant Examiner* — Thuy-Ai Nguyen

(57) ABSTRACT

Flame resistant compositions based on nylon-6 (PA 6) or nylon-6,6 (PA 66) may include melamine cyanurate, titanium dioxide, glass fibers, and non-fibrous and non-foamed ground glass having a specific particle size distribution, geometry and optionally sizing. Methods for producing the composition are also provided, as well as use of the compositions for production of products for the electrical industry, preferably electrical components such as residual current circuit breakers and other circuit breakers.

10 Claims, No Drawings

POLYAMIDE COMPOSITIONS

The present invention relates to compositions based on nylon-6 (PA 6) or nylon-6,6 (PA 66) comprising melamine cyanurate, titanium dioxide, glass fibres and non-fibrous and non-foamed ground glass having a specific particle size distribution, geometry and optionally sizing, and to the production and use of the inventive compositions for production of products for the electrical industry, preferably electrical components, more preferably for production of residual current circuit breakers and other circuit breakers.

BACKGROUND

To modify processing, working and use characteristics, most plastics are provided with auxiliaries and with fillers and reinforcers. The latter improve properties such as stiffness, strength, heat resistance, dimensional stability, and reduce the thermal expansion of products based on plastics.

Of particular significance for plastics compositions are fillers and reinforcers composed of minerals or glass, especially borosilicate glass or silicate glass, which is used in a wide variety of different forms, for example in the form of glass fibres, glass flakes or else in the form of expanded glass or foamed glass. Fillers and reinforcers have a significant influence on the heat resistance of plastics. For example, when fibrous fillers having a correspondingly high aspect ratio are used, very good heat resistances are achieved. However, the anisotropic geometry of a fibre in the course of processing leads to alignment of the fibres in flow direction and to associated anisotropic shrinkage during processing, which subsequently leads to unwanted warpage in the products. The "wick effect" associated with the fibres also leads to a deterioration in the self-extinguishment properties of these products, these being of significance, for example, in the glow wire test to IEC 60695-2-12 (GWFI). In order to be able to assure sufficient flame retardancy of plastics-based products with fibrous fillers too, for example glass fibres, it is generally necessary to use halogen- or phosphorus-based flame retardants. Halogen-based flame retardants are the subject of public discussion because they accumulate in the environment. It is desirable to avoid phosphorus-based flame retardants because of energy-intensive production. Moreover, in the case of phosphorus-containing flame retardants, there is the risk of corrosive deposits at electrical contacts when the product is an electrical component or electronic component.

When non-fibrous fillers are used, especially talc, clay minerals, mica, expanded glass or foamed glass, isotropic shrinkage is obtained in products, but these moulding compositions and the products that are produced therefrom then frequently have inadequate heat resistances (<130° C.) or inadequate self-extinguishment properties in the GWFI test at relatively low wall thicknesses, especially wall thicknesses <1 mm.

When non-fibrous fillers are used, especially talc, clay minerals, mica, expanded glass or foamed glass, isotropic shrinkage is obtained in products, but these moulding compositions and products that can be produced therefrom then have inadequate heat resistances (<130° C.) or inadequate self-extinguishment properties in the GWFI test at relatively low wall thicknesses, especially wall thicknesses <1 mm.

EP 2468810 A1 Example 3 describes a polyamide-based composition comprising, as well as melamine cyanurate, ground glass and also ground chopped glass fibres. A disadvantage of this composition according to EP 2468810 A1 is its poor heat resistance and associated significantly restricted usability in electrical components, for example circuit breakers.

But a good heat resistance with simultaneously isotropic shrinkage characteristics and good self-extinguishment properties in the GWFI test is an important prerequisite for use in electronic components of complex structure, especially in residual current circuit breakers and other circuit breakers.

According to "http://de.wikipedia.org/wiki/Leitungsschutzschalter", a circuit breaker, also colloquially called cutout or fuse for short, is an excess current protection device in electrical installation and is used in low-voltage grids. A residual current circuit breaker provides protection from fault currents (see: http://de.wikipedia.org/wiki/Fehlerstromschutzschalter).

It was therefore an object of the present invention to provide polyamide-based compositions suitable for production of products for the electrical industry, these products being notable for high heat resistance with simultaneously low isotropic shrinkage characteristics, and for good self-extinguishment properties in the glow wire test to IEC60695-2-12, even with low wall thicknesses, especially with wall thicknesses around 0.8 mm.

According to "http://de.wikipedia.org/wiki/W%C3%A4rmeformbest%C3%A4ndigkeit", heat resistance is a measure of the thermal durability of plastics. Because they have viscoelastic material characteristics, there is no strictly defined upper use temperature for plastics; instead, a substitute parameter is determined under defined load. For this purpose, two standardized methods are available, the method of heat deflection temperature (HDT) and the Vicat softening temperature (VST).

The method of the heat deflection temperature described in DIN EN ISO 75-1,-2,-3 (precursor: DIN 53461) uses standard test specimens with rectangular cross section, which are subjected to three-point bending under constant load, preferably with their edges flat. According to the test specimen height, an edge fibre strain $\sigma_f$ of 1.80 (Method A), 0.45 (Method B) or 8.00 N/mm² (Method C) is achieved by using weights or/and springs to apply a force $$F = \frac{2\sigma_f b h^2}{3L}$$

b: sample width
h: sample height
L: distance between rests.

Subsequently, the stressed samples are subjected to heating at a constant heating rate of 120 K/h (or 50 K/h). If the deflection of the sample reaches an edge fibre elongation of 0.2%, the corresponding temperature is the heat deflection temperature (or heat distortion temperature) HDT.

The Vicat softening temperature (VST) to DIN EN ISO 306 (precursor: DIN 53460) is measured with a needle (having a circular area of 1 mm²). A test force of 10 N (test force A) or 50 N (test force B) is applied thereto. The test specimen having a permissible thickness of 3 to 6.4 mm is subjected to a defined heating rate of 50 or 120 K/h. The VST has been attained when the penetrating body reaches a penetration depth of 1 mm. According to the standard, the test is only applicable to thermoplastics and gives an Indication of the practical sustained use limit, which is about 15 K below the Vicat temperature. Variation of the boundary conditions gives four parameter combinations:

VST/A50
VST/A120
VST/B50 (preferred method for comparative tests (ISO 10350-1)
VST/B120.

According to "http://de.wikipedia.org/wiki/Schwindung#Schwindung_bei_Gie.C3.9Fharzen", shrinkage is the change in volume of a material or workpiece without removal of material or exertion of force. Shrinkage takes place through drying, cooling or chemical or physical transformation mechanisms in the material. Low shrinkage in casting resins based on thermoplastics is a quality criterion, since installed components can otherwise come under compressive stress, and gaps can form between these and other components to be wetted if adhesion is insufficient. In the case of Injection-moulded products in electrical engineering/electronics, shrinkage can lead to ingress of moisture and to reduced stress resistance. Isotropic shrinkage is understood by the person skilled in the art to mean equal shrinkage in all spatial directions. The shrinkage characteristics are tested to DIN EN ISO 294-4, as is also the case in the context of the present invention.

SUMMARY OF THE INVENTION

It has now been found that, surprisingly, compositions based on PA 6 or PA 66, when non-fibrous and non-foamed, ground glass is used in the form described in detail below in combination with glass fibres, melamine cyanurate and titanium dioxide, lead to electrical or electronic articles having excellent properties in relation to heat resistance, flame retardancy in the glow wire test to IEC60695-2-12 and isotropic shrinkage characteristics.

DESCRIPTION OF THE PREFERRED EMBODIMENTS

In an embodiment, compositions may include:
A) nylon-6 or nylon-6,6,
B) non-fibrous and non-foamed ground glass having a d90 determined by laser diffractometry in the range from 5 to 250 µm, preferably in the range from 10 to 150 µm, more preferably in the range from 15 to 80 µm, most preferably in the range from 16 to 25 µm,
C) glass fibres,
D) melamine cyanurate, and
E) titanium dioxide.

For clarity, it should be noted that the scope of the present invention encompasses all the definitions and parameters mentioned hereinafter in general terms or specified within areas of preference, in any desired combinations.

Various embodiments of the compositions may include:
A) 5% to 92.8% by weight, preferably 20% to 90% by weight, more preferably 30% to 80% by weight, of nylon-6 or nylon-6,6,
B) 5% to 80% by weight, preferably 10% to 60% by weight, more preferably 15% to 50% by weight, of a non-fibrous and non-foamed ground glass having a d90 determined by laser diffractometry in the range from 5 to 250 µm, preferably in the range from 10 to 150 µm, more preferably in the range from 15 to 80 µm, most preferably in the range from 16 to 25 µm,
C) 2% to 8% by weight, preferably 3% to 7% by weight, more preferably 4% to 6% by weight, of glass fibres,
D) 0.1% to 40% by weight, preferably 1% to 20% by weight, of melamine cyanurate, and
E) 0.1% to 10% by weight, preferably 0.5% to 5% by weight, more preferably 1% to 2% by weight, of titanium dioxide, with the proviso that the sum total of all the percentages by weight is always 100%.

The compositions are formulated for further utilization by mixing the components A) to E) for use as reactants in at least one mixing apparatus. This gives, as intermediates, moulding compositions based on the inventive compositions. These moulding compositions may either consist exclusively of components A) to E), or else contain further components in addition to components A) to E). In this case, components A) to E) should be varied within the scope of the ranges specified such that the sum total of all the percentages by weight is always 100%.

The invention therefore additionally provides inventive moulding compositions intended for use in extrusion, in blow moulding or in injection moulding, preferably in pellet form, comprising the inventive compositions which make up 95% to 100% by weight, preferably 98% to 100% by weight, more preferably 99% to 100% by weight, of the inventive moulding compositions or of those used in accordance with the invention for production of products for the electrical industry.

The particle size is determined in the context of the present invention by laser diffractometry in analogy to standard ISO 13320. The figures for the particle size distribution and for the particle sizes are based here on so-called surface-based particle sizes, in each case prior to incorporation into the thermoplastic moulding composition. With regard to laser diffractometry, see C. M. Keck, Moderne Pharmazeutische Technologie [Modern Pharmaceutical Technology] 2009, Freie Universität Berlin, Chapter 3.1. or QUANTACHROME PARTIKELWELT NO 6, June 2007, pages 1 to 16.

In an embodiment, the non-fibrous, non-foamed ground glass has been sized with B') at least one aminoalkyltrialkoxysilane, preferably in amounts of 0.01% by weight to 1.5% by weight, based on the amount of the non-fibrous and non-foamed ground glass.

In one embodiment, the compositions comprise, in addition to components A), B), C), D) and E) or A), B), B'), C), D) and E), also F) 0.01% to 5% by weight, even more preferably 0.05% to 3% by weight, especially preferably 0.1% to 2% by weight, based in each case on the overall composition, of at least one lubricant and/or demoulding agent, in which case the levels of the other components are reduced to such an extent that the sum total of al the percentages by weight is always 100%.

In one embodiment, the compositions comprise, in addition to components A) to F) or instead of F), also G) 0.01% to 10% by weight, preferably 0.1% to 5% by weight, more preferably 0.5% to 3.5% by weight, based in each case on the overall composition, of at least one laser absorber selected from the group of antimony trioxide, tin oxide, tin orthophosphate, barium titanate, aluminium oxide, copper hydroxyphosphate, copper orthophosphate, potassium copper diphosphate, copper hydroxide, antimony tin oxide, bismuth trioxide and anthraquinone, in which case the levels of the other components are reduced to such an extent that the sum total of all the percentages by weight is always 100%.

In one embodiment, the compositions comprise, in addition to components A) to G) or instead of F) and/or G), also H) 0.01% to 60% by weight, preferably 1% to 30% by weight, more preferably 5% to 25% by weight, most preferably 0.01% to 60% by weight, based in each case on the overall composition, of at least one further flame retardant other than melamine cyanurate (=component D)), in which case the levels of the other components are reduced to such an extent that the sum total of all the percentages by weight is always 100%.

Preference is given in accordance with the Invention to using halogen-free and/or phosphorus-free flame retardants.

In one embodiment, the compositions comprise, in addition to components A) to H) or instead of F) and/or G) and/or H), also component K) 0.01% to 50% by weight, preferably 1% to 30% by weight, even more preferably 2% to 15% by weight, very especially preferably 2% to 6% by weight, based in each case on the overall composition, of at least one filler other than components B) and C), in which case the levels of the other components are reduced to such an extent that the sum total of all the percentages by weight is always 100%.

In one embodiment, the compositions comprise, in addition to components A) to K) or instead of components F) and/or G) and/or H) and/or K), also L) 0.01% to 20% by weight, preferably 0.05% to 10% by weight, most preferably 0.1% to 5% by weight, based in each case on the overall composition, of at least one further additive other than components D) and E), in which case the levels of the other components are reduced to such an extent that the sum total of all the percentages by weight is always 100%.

As per the above, the following possible combinations of components A), B), B'), C), D), E), F), G), H), K), and L) are provided. For simplification, (X) will represent both a combination of components ABCDE and a combination of components ABB'CDE, such that possible combinations may include:
 1 additional component: XF, XG, XH, XK, XL;
 2 additional components: XFG, XFH, XGH, XFK, XGK, XHK, XFL, XGL, XHL, XKL;
 3 additional components: XFGH, XFGK, XFHK, XGHK, XFGL, XFHL, XGHL, XFKL, XGKL, XHKL;
 4 additional components: XFGHK, XFGHL, XFGKL, XFHKL, XGHKL; and
 5 additional components: XFGHKL.

Component A)

As component A), the compositions comprise PA 6 (nylon-6) or PA 66 (nylon-66). Copolyamides based on PA 6 and/or PA 66 are encompassed by the subject-matter of the present invention.

The nomenclature of the polyamides used in the context of the present application corresponds to the international standard, the first number(s) indicating the number of carbon atoms in the starting diamine and the last number(s) the number of carbon atoms in the dicarboxylic acid. If only one number is stated, as in the case of PA6, this means that the starting material was an α,ω-aminocarboxylic add or the lactam derived therefrom, i.e. ε-caprolactam in the case of PA6; for further information, reference is made to H. Domininghaus, Die Kunststoffe und ihre Eigenschaften [The Polymers and Their Properties], pages 272 ff., VDI-Verlag, 1976.

Preferably, the nylon-6 or the nylon-6,6 for use as component A) has a viscosity number determined in a 0.5% by weight solution in 96% by weight sulphuric acid at 25° C. to ISO 307 in the range from 80 to 180 ml/g.

More preferably, the nylon-6 for use as component A), by the standard specified and by the method specified above, has a viscosity number in the range from 85 to 160 ml/g, most preferably a viscosity number in the range from 90 to 140 ml/g.

The nylon-6,6 for use as component A), by the method specified above, more preferably has a viscosity number in the range from 110 to 170 ml/g, most preferably a viscosity number in the range from 130 to 160 ml/g.

In accordance with Hans Domininghaus in "Die Kunststoffe und ihre Eigenschaften", 5th edition (1998), p. 14, thermoplastic polyamides are understood to mean polyamides wherein the molecule chains do not have any side branches or else have side branches which are of greater or lesser length and differ in terms of number, and which soften when heated and are formable to a virtually unlimited degree.

The polyamides preferred in accordance with the invention can be prepared by various processes and synthesized from very different units and, in the specific application case, can be modified alone or in combination with processing auxiliaries, stabilizers or else polymeric alloy partners, preferably elastomers, to give materials having specific combinations of properties. Also suitable are blends having proportions of different polymers, preferably of polyethylene, polypropylene, ABS, in which case it is optionally possible to use one or more compatibilizers. The properties of the polyamides can be improved through addition of elastomers, for example in terms of Impact resistance. The multitude of possible combinations enables a very large number of products having a wide variety of different properties.

A multitude of procedures for preparation of polyamides have become known, with use, depending on the desired end product, of different monomer units, different chain transfer agents to establish a desired molecular weight, or else monomers with reactive groups for aftertreatments intended at a later stage.

The processes of industrial relevance for preparation of the polyamides usually proceed via polycondensation in the melt. In the context of the present invention, the hydrolytic polymerization of lactams is also regarded as polycondensation.

The PA 6 and PA 66 for use as component A) are semicrystalline polyamides. Semicrystalline polyamides have, according to DE 10 2011 084 519 A1, an enthalpy of fusion in the range from 4 to 25 J/g, measured by the DSC method to ISO 11357 in the 2nd heating operation and Integration of the melt peak. In contrast, amorphous polyamides have an enthalpy of fusion of less than 4 J/g, measured by the DSC method to ISO 11357 in the 2nd heating operation and integration of the melt peak.

Polyamides or copolyamides for use with preference as component A) in accordance with the invention are those which are prepared proceeding from diamines and dicarboxylic acids and/or lactams having at least 5 ring members or corresponding amino acids. Useful reactants preferably include aliphatic dicarboxylic acids, more preferably adipic acid, aliphatic diamines, more preferably hexamethylenediamine, aminocarboxylic acids, especially aminocaproic acid, or the corresponding lactams. Copolyamides of a plurality of the monomers mentioned are included.

The nylon-6 for use with preference as component A) Is obtainable from ε-caprolactam. The nylon-6,6 for use with preference as component A) is obtainable from hexamethylenediamine and adipic acid.

Preference is further given to most of the compounds based on PA 6, PA 66 or copolyamides thereof, in which there are 3 to 11 methylene groups, very especially preferably 4 to 6 methylene groups, for each polyamide group in the polymer chain.

Component B)

As component B), the compositions comprise non-fibrous and non-foamed ground glass having a particle size distribution having a d90 in the range from 5 to 250 µm, preferably in the range from 10 to 150 µm, more preferably in the range from 15 to 80 µm, most preferably in the range from 16 to 25 µm. Preference is given here to using non-fibrous and non-foamed ground glass additionally having a d10 in the range from 0.3 to 10 µm, preferably in the range from 0.5 to 6 µm, more preferably in the range from 0.7 to 3 µm. Very particular preference is given to such non-fibrous and non-foamed ground glass as also has a d50 in the range from 3 to 50 µm, preferably in the range from 4 to 40 µm, more preferably in the range from 5 to 30 µm.

As well as the reference cited at the outset, with regard to the d10, d50 and d90 values, the determination thereof and the meaning thereof, reference is also made to Chemie Ingenieur Technik (72) p. 273-276, 3/2000, Wiley-VCH Verlags GmbH, Weinheim, 2000, according to which the d10 is that particle size below which 10% of the amount of particles lie, d50 is that particle size below which 50% of the amount of particles lie (median value) and the d90 is that particle size below which 90% of the amount of particles lie. Said reference teaches the determination of the d10, d50 or d90 values by at least one method from the group of laser diffraction spectrometry, white-light diffraction spectrometry, screen analysis, photosedimentation, image analysis, measurement of the chord length on individual particles and time-of-flight measurement.

Preferably, a non-fibrous and non-foamed ground glass for use in accordance with the invention has a median particle size in the range from 3 to 60 µm, especially preferably in the range from 15 to 30 µm. The figures for the particle size distribution and for the particle sizes are based here on so-called surface-based particle sizes, in each case prior to incorporation into the thermoplastic moulding composition. In this context, the diameters of the surfaces of the respective glass particles are expressed in relation to the surfaces of imaginary spherical particles (spheres). This is preferably accomplished with a particle size analyzer that works by the principle of laser dimming from Ankersmid (Eye Tech® including the EyeTech® software and ACM-104 measurement cell, Ankersmid Lab, Oosterhout, the Netherlands). Alternatively, the particle size distribution can also be measured according to the reference about laser diffractometry cited at the outset. For this purpose, the glass for use in accordance with the Invention is suspended in a 0.1% aqueous sodium polyphosphate solution and then analyzed by laser diffractometry with a LS 13320 particle size analyzer from Beckman Coulter GmbH, Krefeld, Germany.

Preferably in accordance with the invention, the non-fibrous and non-foamed ground glass is in particulate, non-cylindrical form and has a length to thickness ratio of less than 5, preferably less than 3, more preferably less than 2. The value of zero is of course impossible.

For delimitation of the present invention, foamed glass, frequently also called expanded glass, is understood to mean a glass in which gas bubbles, for example of air or carbon dioxide, are enclosed. However, this inclusion of gas, in contrast to the non-foamed glass for use in accordance with the invention, leads to a reduction in density. The non-foamed and non-fibrous ground glass for use in accordance with the invention thus does not undergo any reduction in density through any inclusions of gas.

For delimitation of the present invention, fibrous glass is understood to mean a glass geometry having a cylindrical or oval cross section having an aspect ratio (length/diameter ratio) greater than 5. The non-foamed and non-fibrous ground glass for use as component B) is therefore additionally characterized in that it does not have the glass geometry typical of fibrous glass with a cylindrical or oval cross section having an aspect ratio (length/diameter ratio) greater than 5.

The non-foamed and non-fibrous ground glass for use in accordance with the Invention is preferably obtained by grinding glass with a mill, preferably a ball mill and more preferably with subsequent sifting or screening. Useful starting materials include al geometric forms of solidified glass.

Preferred starting materials for the grinding to give non-fibrous and non-foamed ground glass for use in accordance with the invention are also glass wastes as obtained especially in the production of glass products as unwanted by-product and/or as off-spec main product. These especially include waste glass, recycled glass and broken glass as can be obtained especially in the production of window or bottle glass, and in the production of glass-containing filers and reinforcers, especially in the form of what are called melt cakes. The glass may be coloured, although preference is given to non-coloured glass as starting material.

Useful starting glass for the grinding in principle includes all glass types as described, for example, in DIN 1259-1. Preference is given to soda-lime glass, float glass, quartz glass, lead crystal glass, borosilicate glass, A glass and E glass, particular preference being given to soda-lime glass, borosilicate glass, A glass and E glass, very particular preference to A glass and E glass, and especial preference E glass. For the physical data and composition of E glass, reference may be made to "http://wiki.r-g.de/index.php?title=Glasfasern". Non-fibrous and non-foamed ground E glass for use with especial preference in accordance with the invention has at least one of the following features specified in Table 1:

TABLE 1

| Properties of E glass | Unit | E glass |
| --- | --- | --- |
| Density | g/cm² at 20° C. | 2.6 |
| Tensile strength | MPa | 3400 |
| Tensile modulus of elasticity | GPa | 73 |
| Elongation at break | % | 3.5-4 |
| Chemical composition | Unit | Value |
| $SiO_2$ | % | 53-55 |
| $Al_2O_3$ | % | 14-15 |
| $B_2O_3$ | % | 6-8 |
| CaO | % | 17-22 |
| MgO | % | <5 |
| $K_2O$, $Na_2O$ | % | <1 |
| Other oxides | % | about 1 |

For the production of the non-foamed and non-fibrous glass for use in accordance with the invention, particular preference is likewise given to glass types in which the $K_2O$ content is less than or equal to 2% by weight, based on all the components of the glass. The non-foamed and non-fibrous ground glass for use in accordance with the Invention can be purchased, for example, from Vitro Minerals Inc., Covington, Ga., USA. It is supplied as CS Glass Powder in the specifications CS-325, CS-500 and CS-600, or else as LA400 (see also "www.glassfillers.com" or Chris DeArmitt, Additives Feature, Mineral Fillers, COMPOUNDING WORLD, February 2011, pages 28-38 or "www.compoundingworld.com"). For these glasses, Vitro Minerals Inc. gives the CAS No. 65997-17-3 with the designation glass oxide.

Component B) preferably has a density (not bulk density!) to ASTM C 693 in the range from 2400 to 2700 kg/m³, more preferably in the range from 2400 to 2600 kg/m³, and is therefore distinctly different from foamed glass (density=100-165 kg/m³), foamed glass pellets (density=130-170 kg/m³) and expanded glass (density=110-360 kg/m³); see also AGY Produktbroschüre Pub. No. LIT-2006-111 R2 (02/06).

Preferably in accordance with the invention, the non-foamed and non-fibrous ground glass to be used is provided with surface modification or sizing (component B') based on aminoalkyltrialkoxysilane. In alternative or preferred embodiments, the non-foamed and non-fibrous ground glass may be provided with additional surface modification or sizing based on silane or siloxane, preferably with glycidyl-, carboxyl-, alkenyl-, acryloyloxyalkyl- and/or methacryloyloxyalkyl-functionalized trialkoxysilanes or aqueous hydrolysates thereof, and combinations thereof.

Preferred aminoalkyltrialkoxylsilanes are aminopropyltrimethoxysilane, aminobutyltrimethoxysilane, aminopropyltriethoxysilane, aminobutyltriethoxysilane or aqueous hydrolysates thereof, very especial preference being given to aminopropyltriethoxysilane.

The aminoalkyltrialkoxysilanes are preferably used for surface coating in amounts of 0.01% by weight to 1.5% by weight, more preferably in amounts of 0.05% by weight to 1.0% by weight and most preferably in amounts of 0.1% by weight to 0.5% by weight, based on the non-foamed and non-fibrous ground glass B).

The starting glass for the grinding may already have been given surface modification or sizing treatment. It is likewise possible for the non-foamed and non-fibrous ground glass for use in accordance with the invention to be given surface modification or sizing treatment after the grinding.

It is especially possible to use MF7900 from Lanxess Deutschland GmbH, Cologne, a non-fibrous and non-foamed ground glass based on E glass containing about 0.1% by weight having a d90 of 54 μm, a d50 of 14 μm, a d10 of 2.4 μm, and having a median particle size of 21 μm, based in each case on the particle surface area, containing about 0.1% by weight of triethoxy(3-aminopropyl)silane size.

The non-foamed and non-fibrous ground glass for use in accordance with the invention may, as a result of the processing to give the inventive composition or to give products from the inventive composition, or in the product, have a smaller d90 or d50 or d10 or a smaller median particle size than the ground particles originally used.

Component C)

According to "http://de.wikipedia.org/wiki/Faser-Kunstoff-Verbund", cut fibres, also referred to as short fibres, having a length in the range from 0.1 to 1 mm, are distinguished from long fibres having a length in the range from 1 to 50 mm and continuous fibres having a length L>50 mm. Short fibres are used in injection moulding technology and can be processed directly with an extruder. Long fibres can likewise still be processed in extruders. They are used on a large scale in fibre injection moulding. Long fibres are frequently added to thermosets as a filler. Continuous fibres are used in the form of rovings or fabric in fibre-reinforced plastics. Products comprising continuous fibres achieve the highest stiffness and strength values. Additionally supplied are ground glass fibres having a length after grinding typically in the range from 70 to 200 μm.

Preferably, continuous glass fibres or chopped long glass fibres having the lengths specified above for fibres are used for component C).

More preferably in accordance with the invention, chopped long glass fibres having a starting length in the range from 1 to 50 mm, more preferably in the range from 1 to 10 mm, most preferably in the range from 2 to 7 mm, are used for component C). The glass fibres of component C) may, as a result of the processing to give the moulding composition or to give the product, have a lower d97 or d50 value in the moulding composition or in the product than the glass fibres originally used. Thus, the arithmetic mean of the glass fibre length after processing is frequently only in the range from 150 μm to 300 μm.

Glass fibres for use with preference as component C) have a fibre diameter in the range from 7 to 18 μm, more preferably in the range from 9 to 15 μm. The glass fibres of component C), in a preferred embodiment, are modified with a suitable size system or an adhesion promoter or adhesion promoter system. Preference is given to using a silane-based size system or adhesion promoter.

Particularly preferred silane-based adhesion promoters for the pretreatment are silane compounds of the general formula (I)

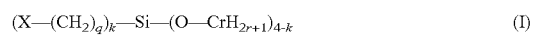

in which
X is $NH_2-$, carboxyl-, HO— or

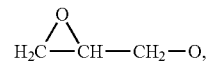

q is an integer from 2 to 10, preferably 3 to 4,
r is an integer from 1 to 5, preferably 1 to 2, and
k is an integer from 1 to 3, preferably 1.

Especially preferred adhesion promoters are silane compounds from the group of aminopropyltrimethoxysilane, aminobutyltrimethoxysilane, aminopropyltriethoxysilane, aminobutyltriethoxysilane, and the corresponding silanes containing a glycidyl group or a carboxyl group as the X substituent, very especial preference being given to carboxyl groups.

For the modification of the glass fibres for use as component C), the adhesion promoters, preferably the silane compounds of formula (I), are used preferably in amounts of 0.05% to 2% by weight, more preferably in amounts of 0.25% to 1.5% by weight and most preferably in amounts of 0.5% to 1% by weight, based in each case on 100% by weight of component C).

According to "http://www.r-g.de/wiki/Glasfasern", glass fibres are produced in a melt spinning process (die drawing, rod drawing and die blowing processes). In the die drawing process, the hot mass of glass flows under gravity through hundreds of die bores in a platinum spinneret plate. The filaments can be drawn at a speed of 3-4 km/minute with unlimited length.

The person skilled in the art distinguishes between different types of glass fibres, some of which are listed here by way of example:
  E glass, the most commonly used material having an optimal cost-benefit ratio (E glass from R&G)
  H glass, hollow glass fibres for reduced weight (R&G hollow glass fibre fabric 160 g/m² and 216 g/m²)
  R, S glass, for high mechanical demands (S2 glass from R&G)

D glass, borosilicate glass for high electrical demands
C glass, with increased chemical durability
quartz glass, with high thermal stability Further examples can be found under "http://de.wikipedia.org/wiki/Glasfaser". E glass fibres have gained the greatest significance for reinforcement of plastics. E stands for electro-glass, since it was originally used in the electrical industry in particular.

For the production of E glass, glass melts are produced from pure quartz with additions of limestone, kaolin and boric acid. As well as silicon dioxide, they contain different amounts of various metal oxides. The composition determines the properties of the products. Preference is given in accordance with the invention to using at least one type of glass fibres from the group of E glass, H glass, R, S glass, D glass, C glass and quartz glasses, particular preference to using glass fibres made of E glass.

Glass fibres made of E glass are the most commonly used reinforcing material. The strength properties correspond to those of metals (for example aluminium alloys), the specific weight of laminates being lower than that of the metals. E glass fibres are non-combustible, heat-resistant up to about 400° C. and resistant to most chemicals and weathering influences.

Component D)

As component D), the inventive compositions comprise melamine cyanurate [CAS No. 37640-57-6]. Melamine cyanurate is understood to mean the reaction product of preferably equimolar amounts of melamine and cyanuric add or isocyanuric acid. These include all standard and commercially available product qualities. Examples of these include Melapur® MC 25 and Melapur® MC50 (from BASF, Ludwigshafen, Germany). The melamine cyanurate for use in accordance with the invention preferably consists of particles having median particle diameters of 0.1 µm to 100 µm, more preferably of 0.1 µm to 30 µm, most preferably 0.1 µm to 7 µm, and can be surface-treated, or coated or sized with known compositions. These preferably include organic compounds which can be applied in monomeric, oligomeric and/or polymeric form to the melamine cyanurate. Especially preferably, it is possible to use coating systems based on silicon-containing compounds, especially organofunctionalized silanes or organosiloxanes. Coatings with inorganic components are likewise possible.

Component E)

The titanium dioxide [CAS No. 13463-67-7] for use as component E) preferably has a median particle size in the range from 90 nm to 2000 nm. Useful titanium dioxide pigments for the titanium dioxide for use as component E) in accordance with the invention include those whose base structures can be produced by the sulphate (SP) or chloride (CP) method, and which have anatase and/or rutile structure, preferably rutile structure. The base structure need not be stabilized, but preference is given to a specific stabilization: in the case of the CP base structure by an Al doping of 0.3-3.0% by weight (calculated as $Al_2O_3$) and an oxygen excess in the gas phase in the oxidation of the titanium tetrachloride to titanium dioxide of at least 2%; in the case of the SP base structure by a doping, preferably with Al, Sb, Nb or Zn. Particular preference is given to "light" stabilization with Al, or in the case of higher amounts of Al doping to compensation with antimony. In the case of use of titanium dioxide as white pigment in paints and coatings, plastics etc., it is known that unwanted photocatalytic reactions caused by UV absorption lead to breakdown of the pigmented material. This involves absorption of light in the near ultraviolet range by titanium dioxide pigments, forming electron-hole pairs, which produce highly reactive free radicals on the titanium dioxide surface. The free radicals formed result in binder degradation in organic media. Preference is given in accordance with the invention to lowering the photoactivity of the titanium dioxide by inorganic aftertreatment thereof, more preferably with oxides of Si and/or Al and/or Zr and/or through the use of Sn compounds.

Preferably, the surface of pigmentary titanium dioxide is covered with amorphous precipitated oxide hydrates of the compounds $SiO_2$ and/or $Al_2O_3$ and/or zirconium oxide. The $Al_2O_3$ shell facilitates pigment dispersion in the polymer matrix; the $SiO_2$ shell makes it difficult for charges to be exchanged at the pigment surface and hence prevents polymer degradation.

According to the invention, the titanium dioxide is preferably provided with hydrophilic and/or hydrophobic organic coatings, especially with siloxanes or polyalcohols.

Titanium dioxide for use as component E) in accordance with the invention preferably has a median particle size in the range from 90 nm to 2000 nm, preferably in the range from 200 nm to 800 nm.

Commercially available products are, for example, Kronos® 2230, Kronos® 2225 and Kronos® vip7000 from Kronos, Dallas, USA.

The titanium dioxide can be used directly as a powder or in the form of masterbatches, in which case the masterbatches are preferably based on polyamide. Alternatively, it is also possible to use titanium dioxide masterbatches based on polycarbonate, polybutylene terephthalate, polyethylene, maleic anhydride-grafted polyethylene and/or maleic anhydride-grafted polypropylene, and it is also possible to use a mixture of said polymers for the masterbatch.

In one embodiment, the invention relates to compositions in which there is no component E), titanium dioxide, if continuous fibres having a starting length L>50 mm are used as component C).

Component F)

The lubricants and/or demoulding agents for use as component F) in a preferred embodiment of the inventive compositions are preferably long-chain fatty acids, especially stearic acid or behenic add, salts thereof, especially calcium stearate or zinc stearate, and the ester derivatives or amide derivatives thereof, especially ethylenebisstearylamide, montan waxes and low molecular weight polyethylene or polypropylene waxes.

Montan waxes in the context of the present invention are mixtures of straight-chain saturated carboxylic acids having chain lengths of 28 to 32 carbon atoms. According to the invention, particular preference is given to using lubricants and/or demoulding agents from the group of the esters or amides of saturated or unsaturated aliphatic carboxylic acids having 8 to 40 carbon atoms with aliphatic saturated alcohols or amines having 2 to 40 carbon atoms, and metal salts of saturated or unsaturated aliphatic carboxylic acids having 8 to 40 carbon atoms. Very particular preference is given to using at least one of the lubricant and/or demoulding agent from the group of ethylenebisstearylamide, calcium stearate and ethylene glycol dimontanate.

Especial preference is given to using calcium stearate [CAS No. 1592-23-0] or ethylenebisstearylamide [CAS No. 110-30-5].

Very especial preference is given to using ethylenebisstearylamide (Loxiol® EBS from Emery Oleochemicals).

Component G)

As component G), at least one laser absorber is used. According to Kunststoffe 8, 2008, 119-121, these are laser light absorbers, preferably for inscription of plastics products. The laser absorber for use as component G) is preferably selected from the group of antimony trioxide, tin oxide, tin orthophosphate, barium titanate, aluminium oxide, copper hydroxyphosphate, copper orthophosphate, potassium copper diphosphate, copper hydroxide, antimony tin oxide, bismuth trioxide and anthraquinone. Particular preference is given to antimony trioxide and antimony tin oxide. Very particular preference is given to antimony trioxide.

The laser absorber, especially the antimony trioxide, can be used directly as a powder or in the form of masterbatches. Preferred masterbatches are those based on polyamide or those based on polybutylene terephthalate, polyethylene, polypropylene, polyethylene-polypropylene copolymer, maleic anhydride-grafted polyethylene and/or maleic anhydride-grafted polypropylene, it being possible to use the polymers for the antimony trioxide masterbatch individually or in a mixture. Very particular preference is given to using antimony trioxide in the form of a nylon-6-based masterbatch.

The laser absorber can be used individually or as a mixture of a plurality of laser absorbers.

Laser absorbers can absorb laser light of a particular wavelength. In practice, this wavelength is in the range from 157 nm to 10.6 μm. Examples of lasers of this wavelength are described in WO2009/003976 A1. Preference is given to using Nd:YAG lasers, with which it is possible to achieve wavelengths of 1064, 532, 355 and 266 nm, and $CO_2$ lasers.

Component H)

In one embodiment, the Inventive compositions may comprise, as component H), as well as melamine cyanurate (component D)), at least one flame retardant other than component D), preferably a halogen-free and/or phosphorus-free flame retardant.

Preferred halogen-free and/or phosphorus-free flame retardants are nitrogen-containing flame retardants, which are used individually or in a mixture.

Preferred nitrogen-containing flame retardants are the reaction products of trichlorotriazine, piperazine and morpholine according to CAS No. 1078142-02-5, especially MCA PPM Triazine HF from MCA Technologies GmbH, Biel-Benken, Switzerland, and condensation products of melamine, for example melem, melam, melon or more highly condensed compounds of this type.

Preferred inorganic nitrogen-containing compounds are ammonium salts.

In addition, it is also possible to use salts of aliphatic and aromatic sulphonic acids and mineral flame retardant additives such as aluminium hydroxide and/or magnesium hydroxide, Ca—Mg carbonate hydrates (e.g. DE-A 4 236 122).

Also useful are flame retardant synergists from the group of the oxygen-, nitrogen- or sulphur-containing metal compounds, preferably zinc oxide, zinc borate, zinc stannate, zinc hydroxystannate, zinc sulphide, molybdenum oxide, magnesium oxide, magnesium carbonate, calcium carbonate, calcium oxide, titanium nitride, boron nitride, magnesium nitride, zinc nitride, zinc phosphate, calcium phosphate, calcium borate, magnesium borate or mixtures thereof.

In an alternative embodiment, it is also possible to use, as component H)—if required—halogen-containing and/or phosphorus-containing flame retardants.

Preferred halogen-containing flame retardants are standard organic halogen compounds, more preferably ethylene-1,2-bistetrabromophthalimide, decabromodiphenylethane, tetrabromobisphenol A epoxy oligomer, tetrabromobisphenol A oligocarbonate, tetrachlorobisphenol A oligocarbonate, polypentabromobenzyl acrylate, brominated polystyrene or brominated polyphenylene ethers, which can be used alone or in combination with synergists, especially antimony trioxide or antimony pentoxide.

Preferred phosphorus-containing flame retardants are red phosphorus, metal phosphinates, especially aluminium phosphinate or zinc phosphinate, metal phosphonates, especially aluminium phosphonate, calcium phosphonate or zinc phosphonate, derivatives of the 9,10-dihydro-9-oxa-10-phosphaphenanthrene 10-oxides (DOPO derivatives), resorcinol bis(diphenyl phosphate) (RDP), including oligomers, and bisphenol A bis(diphenyl phosphate) (BOP) including oligomers, and also zinc bis(diethylphosphinate), aluminium tris(diethylphosphinate), melamine phosphate, melamine pyrophosphate, melamine polyphosphate, melamine poly (aluminium phosphate), melamine poly(zinc phosphate) or phenoxyphosphazene oligomers and mixtures thereof.

Further flame retardants for use as component H) are char formers, more preferably phenol-formaldehyde resins, polycarbonates, polyimides, polysulphones, polyether sulphones or polyether ketones, and anti-dripping agents, especially tetrafluoroethylene polymers.

The flame retardants can be added in pure form, or else via masterbatches or compactates.

Component K)

As component K), the compositions comprise at least one further filer or reinforcer other than components B) and C).

In this case, it is also possible to use mixtures of two or more different fillers and/or reinforcers, preferably based on talc, mica, silicate, quartz, wollastonite, kaolin, amorphous silicas, nanoscale minerals, more preferably montmorillonites or nano-boehmite, magnesium carbonate, chalk, feldspar, barium sulphate and/or fibrous fillers and/or reinforcers based on carbon fibres. Preference is given to using mineral particulate fillers based on talc, mica, silicate, quartz, wollastonite, kaolin, amorphous silicas, magnesium carbonate, chalk, feldspar and/or barium sulphate. Particular preference is given to using mineral particulate fillers based on talc, wollastonite and/or kaolin.

Particular preference is additionally also given to using acicular mineral fillers. Acicular mineral fillers are understood in accordance with the invention to mean a mineral filler with a highly pronounced acicular character. Preference is given to acicular wollastonites. The acicular mineral filler preferably has an aspect ratio in the range from 2:1 to 35:1, more preferably in the range from 3:1 to 19:1, especially preferably in the range from 4:1 to 12:1. The median particle size of the acicular mineral fillers is preferably less than 20 μm, more preferably less than 15 μm, especially preferably less than 10 μm, determined with a CILAS GRANULOMETER.

The fillers and/or reinforcers for use as component K), in a preferred embodiment, have been surface-modified, preferably with an adhesion promoter or adhesion promoter system, more preferably based on silane. However, the pretreatment is not absolutely necessary. Useful adhesion promoters likewise include the silane compounds of the general formula (I) already described above.

For the modification of component K), the silane compounds are generally used in amounts of 0.05% to 2% by weight, preferably 0.25% to 1.5% by weight and especially 0.5% to 1% by weight, based on the mineral filler for surface coating.

The fillers of component K) may also, as a result of the processing to give the composition or to give the product from the composition, or in the product, have a smaller d97 or d50 than the fillers originally used.

Component L)

Additives for use with preference as component L) are antioxidants, UV stabilizers, gamma ray stabilizers, hydrolysis stabilizers, thermal stabilizers, antistats, emulsifiers, nucleating agents, plasticizers, processing auxiliaries, impact modifiers, dyes, pigments and elastomer modifiers. The additives can be used alone or in a mixture, or in the form of masterbatches.

Preference is given to using, as antioxidant, Lowinox® HD 98, 3,3'-bis(3,5-di-tert-butyl-4-hydroxyphenyl)-N,N'-hexamethylenedipropionamide [CAS No. 23128-74-7].

UV stabilizers used are preferably substituted resorcinols, salicylates, benzotriazoles and benzophenones.

Colourants used are preferably inorganic pigments, especially ultramarine blue, iron oxide, zinc sulphide or carbon black, and also organic pigments, preferably phthalocyanines, quinacridones, perylenes, and dyes, preferably nigrosin and anthraquinones.

Thermal stabilizers used are preferably sterically hindered phenols and/or phosphites, hydroquinones, aromatic secondary amines such as diphenylamines, substituted resorcinols, salicylates, benzotriazoles and benzophenones, and also variously substituted representatives of these groups or mixtures thereof. Particular preference is given to using sterically hindered phenols alone or in combination with phosphites, very particular preference being given to the use of N,N'-bis[3-(3',5-di-tert-buty-4'-hydroxyphenyl)proponyl] hexamethylenediamine (e.g. Irganox® 1098 from BASF SE, Ludwigshafen, Germany) [CAS No. 23128-74-7].

Nucleating agents used are preferably sodium phenylphosphinate or calcium phenylphosphinate, aluminium oxide or silicon dioxide, and most preferably talc [CAS No. 14807-96-6], this enumeration being non-exclusive.

Flow auxiliaries used are preferably copolymers of at least one α-olefin with at least one methacrylic ester or acrylic ester of an aliphatic alcohol. Particular preference is given to copolymers in which the α-olefin is formed from ethene and/or propene and the methacrylic ester or acrylic ester contains, as alcohol component, linear or branched alkyl groups having 6 to 20 carbon atoms. Very particular preference is given to 2-ethylhexyl acrylate. Features of the copolymers suitable in accordance with the invention as flow auxiliaries are not just the composition but also the low molecular weight. Accordingly, suitable copolymers for the compositions that are to be protected from thermal degradation in accordance with the invention are particularly those which have an MFI value measured at 190° C. and a load of 2.16 kg of at least 100 g/10 min, preferably of at least 150 g/10 min, more preferably of at least 300 g/10 min. The MFI, melt flow index, serves to characterize the flow of a melt of a thermoplastic and is subject to the standards ISO 1133 or ASTM D 1238. The MFI, and all figures relating to MFI in the context of the present invention, relate or were measured or determined in a standard manner to ISO 1133 at 190° C. with a test weight of 2.16 kg.

Plasticizers for use with preference as component L) are dioctyl phthalate, dibenzyl phthalate, butyl benzyl phthalate, hydrocarbon oils or N-(n-buty)benzenesulphonamide.

The elastomer modifiers for use as component L) preferably include one or more graft polymers of
L.1 5% to 95% by weight, preferably 30% to 90% by weight, of at least one vinyl monomer and
L.2 95% to 5% by weight, preferably 70% to 10% by weight, of one or more graft bases having glass transition temperatures of <10° C., preferably <0° C., more preferably <−20° C.

The graft base L.2 generally has a median particle size (d50) of 0.05 to 10 μm, preferably 0.1 to 5 μm, more preferably 0.2 to 1 μm.

Monomers for L.1 are preferably mixtures of
L.1.1 50% to 99% by weight of vinylaromatics and/or ring-substituted vinylaromatics, especially styrene, α-methylstyrene, p-methylstyrene, p-chlorostyrene, and/or ($C_1$-$C_8$)-alkyl methacrylates, especially methyl methacrylate, ethyl methacrylate, and
L.1.2 1% to 50% by weight of vinyl cyanides, especially unsaturated nitriles such as acrylonitrile and methacrylonitrile, and/or ($C_1$-$C_8$)-alkyl(meth)acrylates, especially methyl methacrylate, glycidyl methacrylate, n-butyl acrylate, t-butyl acrylate, and/or derivatives, especially anhydrides and imides, of unsaturated carboxylic acids, especially maleic anhydride and N-phenylmaleimide.

Preferred monomers L.1.1 are selected from at least one of the monomers styrene, α-methylstyrene and methyl methacrylate; preferred monomers L.1.2 are selected from at least one of the monomers acrylonitrile, maleic anhydride, glycidyl methacrylate and methyl methacrylate.

Particularly preferred monomers are L.1.1 styrene and L.1.2 acrylonitrile.

Graft bases L.2 suitable for the graft polymers for use in the elastomer modifiers are, for example, diene rubbers, EPDM rubbers, i.e. those based on ethylene/propylene, and optionally diene, and also acrylate, polyurethane, silicone, chloroprene and ethylenevinyl acetate rubbers. EPDM stands for ethyl-propylene-diene rubber.

Preferred graft bases L.2 are diene rubbers, especially based on butadiene, isoprene etc., or mixtures of diene rubbers or copolymers of diene rubbers or mixtures thereof with further copolymerizable monomers, especially as per L.1.1 and L.1.2, with the proviso that the glass transition temperature of component L.2 is <10° C., preferably <0° C., more preferably <−10° C.

Particularly preferred graft bases L.2 are ABS polymers (emulsion, bulk and suspension ABS), where ABS stands for acrylonitrile-butadiene-styrene, as described, for example, in DE-A 2 035 390 (=U.S. Pat. No. 3,644,574) or in DE-A 2 248 242 (=GB-A 1 409 275) or in Ullmann, Enzyklopädie der Technischen Chemie [Encyclopedia of Industrial Chemistry], vol. 19 (1980), p. 280 ft. The gel content of the graft base L.2 is preferably at least 30% by weight, more preferably at least 40% by weight (measured in toluene).

The elastomer modifiers or graft polymers are prepared by free-radical polymerization, preferably by emulsion, suspension, solution or bulk polymerization, especially by emulsion or bulk polymerization.

Particularly suitable graft rubbers are also ABS polymers, which are prepared by redox initiation with an initiator system composed of organic hydroperoxide and ascorbic acid according to U.S. Pat. No. 4,937,285.

Since, as is well known, the graft monomers are not necessarily grafted completely onto the graft base in the grafting reaction, according to the invention, graft polymers are also understood to mean those products which are obtained through (co)polymerization of the graft monomers in the presence of the graft base and occur in the workup as well.

Likewise, suitable acrylate rubbers are based on graft bases L.2, which are preferably polymers of alkyl acrylates, optionally with up to 40% by weight, based on L.2, of other polymerizable, ethylenically unsaturated monomers. The preferred polymerizable acrylic esters include $C_1$-$C_8$-alkyl esters, preferably methyl, ethyl, butyl, n-octyl and 2-ethylhexyl esters; haloalkyl esters, preferably halo-$C_1$-$C_8$-alkyl esters, such as chlormethyl acrylate, glycidyl esters and mixtures of these monomers. Particular preference is given here to graft polymers having butyl acrylate as core and methyl methacrylate as shell, especially Paraloid® EXL2300, from Dow Corning Corporation, Midland Mich., USA.

For crosslinking, it is possible to copolymerize monomers having more than one polymerizable double bond. Preferred examples of crosslinking monomers are esters of unsaturated monocarboxylic acids having 3 to 8 carbon atoms and unsaturated monohydric alcohols having 3 to 12 carbon atoms or of saturated polyols having 2 to 4 OH groups and 2 to 20 carbon atoms, preferably ethylene glycol dimethacrylate, allyl methacrylate; polyunsaturated heterocyclic compounds, preferably trivinyl cyanurate and triallyl cyanurate; polyfunctional vinyl compounds, preferably di- and trivinylbenzenes, but also triallyl phosphate and diallyl phthalate.

Preferred crosslinking monomers are alkyl methacrylate, ethylene glycol dimethacrylate, diallyl phthalate and heterocyclic compounds having at least 3 ethylenically unsaturated groups.

Particularly preferred crosslinking monomers are the cyclic monomers triallyl cyanurate, triallyl isocyanurate, triacryloylhexahydro-s-triazine, trialylbenzenes. The amount of the crosslinked monomers is preferably 0.02% to 5% by weight, especially 0.05% to 2% by weight, based on the graft base L.2.

In the case of cyclic crosslinking monomers having at least 3 ethylenically unsaturated groups, it is advantageous to restrict the amount to below 1% by weight of the graft base 1.2.

Preferred "other" polymerizable, ethylenically unsaturated monomers which, alongside the acrylic esters, may optionally serve for preparation of the graft base L.2 are acrylonitrile, styrene, α-methylstyrene, acrylamide, vinyl $C_1$-$C_6$-alkyl ethers, methyl methacrylate, glycidyl methacrylate, butadiene. Preferred acrylate rubbers as graft base L.2 are emulsion polymers having a gel content of at least 60% by weight.

Further preferentially suitable graft bases according to L.12 are silicone rubbers having graft-active sites, as described in DE-A 3 704 657 (=U.S. Pat. No. 4,859,740), DE-A 3 704 655 (=U.S. Pat. No. 4,861,831), DE-A 3 631 540 (=U.S. Pat. No. 4,806,593) and DE-A 3 631 539 (=U.S. Pat. No. 4,812,515).

As well as elastomer modifiers based on graft polymers, it is likewise possible to use elastomer modifiers which are not based on graft polymers and have glass transition temperatures of <10° C., preferably <0° C., more preferably <−20° C. These preferably include elastomers having a block copolymer structure, and additionally thermoplastically meltable elastomers, especially EPM, EPDM and/or SEBS rubbers (EPM32 ethylene-propylene copolymer, EPDM=ethylene-propylene-diene rubber and SEBS=styrene-ethene-butene-styrene copolymer).

In a preferred embodiment, the present invention relates to compositions comprising:
A) 5% to 92.79% by weight, preferably 20% to 90% by weight, more preferably 30% to 80% by weight, of nylon-6,
B) 5% to 80% by weight, preferably 10% to 60% by weight, more preferably 15% to 50% by weight, of a non-fibrous and non-foamed glass having a d90 determined by laser diffractometry in the range from 5 to 250 µm, preferably in the range from 10 to 150 µm, more preferably in the range from 15 to 80 µm, most preferably in the range from 16 to 25 µm,
C) 2% to 8% by weight, preferably 3% to 7% by weight, more preferably 4% to 6% by weight, of glass fibres,
D) 0.1% to 40% by weight, preferably 1% to 20% by weight, of melamine cyanurate,
E) 0.1% to 10% by weight, preferably 0.5% to 5% by weight, more preferably 1% to 2% by weight, of titanium dioxide, and
H) 0.01% to 60% by weight, preferably 1% to 30% by weight, more preferably 5% to 25% by weight, of ethylenebisstearylamide, with the proviso that the sum total of all the percentages by weight is always 100%.

In a preferred embodiment, the present invention relates to compositions comprising:
A) 5% to 92.79% by weight, preferably 20% to 90% by weight, more preferably 30% to 80% by weight, of nylon-6,6,
B) 5% to 80% by weight, preferably 10% to 60% by weight, more preferably 15% to 50% by weight, of a non-fibrous and non-foamed glass having a d90 determined by laser diffractometry in the range from 5 to 250 µm, preferably in the range from 10 to 150 µm, more preferably in the range from 15 to 80 µm, most preferably in the range from 16 to 25 µm,
C) 2% to 8% by weight, preferably 3% to 7% by weight, more preferably 4% to 6% by weight, of glass fibres,
D) 0.1% to 40% by weight, preferably 1% to 20% by weight, of melamine cyanurate,
E) 0.1% to 10% by weight, preferably 0.5% to 5% by weight, more preferably 1% to 2% by weight, of titanium dioxide, and
H) 0.01% to 60% by weight, preferably 1% to 30% by weight, more preferably 5% to 25% by weight, of ethylenebisstearylamide, with the proviso that the sum total of all the percentages by weight is always 100%.

In a preferred embodiment, the present invention relates to compositions comprising:
A) 5% to 92.78% by weight, preferably 20% to 90% by weight, more preferably 30% to 80% by weight, of nylon-6,
B) 5% to 80% by weight, preferably 10% to 60% by weight, more preferably 15% to 50% by weight, of a non-fibrous and non-foamed ground glass having a d90 determined by laser diffractometry in the range from 5 to 250 µm, preferably in the range from 10 to 150 µm, more preferably in the range from 15 to 80 µm, most preferably in the range from 16 to 25 µm,
C) 2% to 8% by weight, preferably 3% to 7% by weight, more preferably 4% to 6% by weight, of glass fibres,
D) 0.1% to 40% by weight, preferably 1% to 20% by weight, of melamine cyanurate,
E) 0.1% to 10% by weight, preferably 0.5% to 5% by weight, more preferably 1% to 2% by weight, of titanium dioxide,
H) 0.01% to 60% by weight, preferably 1% to 30% by weight, more preferably 5% to 25% by weight, of ethylenebisstearylamide, and
L) 0.01% to 20% by weight, preferably 0.05% to 10% by weight, most preferably 0.1% to 5% by weight, of 3,3'-bis(3,5-d-tert-butyl-4-hydroxyphenyl)-N,N'-hexamethylenedipropionamide, with the proviso that the sum total of all the percentages by weight is always 100%.

In a preferred embodiment, the present invention relates to compositions comprising:

A) 5% to 92.78% by weight, preferably 20% to 90% by weight, more preferably 30% to 80% by weight, of nylon-6,6, B) 5% to 80% by weight, preferably 10% to 60% by weight, more preferably 15% to 50% by weight, of a non-fibrous and non-foamed ground glass having a d90 determined by laser diffractometry in the range from 5 to 250 µm, preferably in the range from 10 to 150 µm, more preferably in the range from 15 µm to 80 µm, most preferably in the range from 16 to 25 µm, C) 2% to 8% by weight, preferably 3% to 7% by weight, more preferably 4% to 6% by weight, of glass fibres, D) 0.1% to 40% by weight, preferably 1% to 20% by weight, of melamine cyanurate, E) 0.1% to 10% by weight, preferably 0.5% to 5% by weight, more preferably 1% to 2% by weight, of titanium dioxide, H) 0.01% to 60% by weight, preferably 1% to 30% by weight, more preferably 5% to 25% by weight, of ethylenebisstearylamide, and L) 0.01% to 20% by weight, preferably 0.05% to 10% by weight, most preferably 0.1% to 5% by weight, of 3,3'-bis(3,5-di-tert-butyl-4-hydroxyphenyl)-N,N'-hexamethylenepropionamide, with the proviso that the sum total of all the percentages by weight is always 100%.

Process

The present invention additionally relates to a process for producing products, preferably electrical components, more preferably residual current circuit breakers and other circuit breakers, most preferably circuit breakers having rated currents >16 A, especially preferably circuit breakers having rated currents >32 A, very especially preferably circuit breakers having rated currents >64 A, through use of the inventive compositions in infection moulding processes, including the special methods of GIT (gas injection technology), WIT (water injection technology) and PIT (projectile injection technology), in extrusion processes, including in profile extrusion, or in blow moulding processes.

For production of these products, the individual components of the inventive composition are first mixed in at least one mixing tool and this mixture, which is then in the form of a moulding composition, is either fed through at least one mixing tool outlet directly to further processing or is discharged as a strand and cut into pellets of the desired length by means of a pelletizer, preferably a rotating bladed roller, in order to be available for a later processing operation.

Since most processors require plastics in the form of pellets, pelletizing is playing an ever more important role. A basic distinction is made between hot cutting and cold cutting. This results in different particle forms according to the processing. In the case of hot cutting, the pellets comprising the inventive compositions are obtained in beads or lenticular form; in the case of cold cutting, the pellets comprising the inventive compositions are obtained in cylinder forms or cube forms. Inventive compositions in pellet form are preferably obtained by cold cutting.

The person skilled in the art is at liberty to use different mixing tools suitable for achieving an optimal mixing outcome in terms of a mixture of the components in the compositions for use in accordance with the invention. An extruder is a preferred mixing tool in the context of the present invention. Preferred extruders are single-screw extruders or twin-screw extruders and the respective subgroups, most preferably conventional single-screw extruders, conveying single-screw extruders, contra-rotating twin-screw extruders or co-rotating twin-screw extruders. These are familiar to those skilled in the art from Technische Thermoplaste 4. Polyamide [Industrial Thermoplastics, 4. Polyamides], eds.: G. W. Becker and D. Braun, Carl Hanser Verlag, 1998, p. 311-314 and K. Brast, Thesis "Verarbeitung von Langfaser-verstärkten Thermoplasten im direkten Plastifizier-/Pressverfahren" [Processing of Long-Fibre Reinforced Thermoplastics Using the Direct Strand-Deposition Process], Rheinisch-Westfälische Technische Hochschule Aachen, 2001, p. 30-33.

The compositions present in the form of a moulding composition or pellets in accordance with the invention are ultimately used to produce the inventive products, preferably electrical or electronic products, by moulding methods. Preferred moulding methods are injection moulding or extrusion.

Inventive processes for producing products by extrusion or injection moulding work preferably at melt temperatures in the range from 230 to 330° C., more preferably at melt temperatures in the range from 250 to 300° C., and preferably additionally at pressures of not more than 2500 bar, more preferably at pressures of not more than 2000 bar, most preferably at pressures of not more than 1500 bar and especially preferably at pressures of not more than 750 bar.

The process of injection moulding features melting (plasticization) of the composition for use in accordance with the invention, preferably in pellet form, in a heated cylindrical cavity, and injection thereof as an injection moulding material under pressure into a temperature-controlled cavity. After the cooling (solidification) of the material, the injection moulding is demoulded. This process is divided into the steps of:

1. Plasticization/melting
2. Injection phase (filling operation)
3. Hold pressure phase (owing to thermal contraction in the course of crystallization)
4. Demoulding.

An injection moulding machine consists of a closure unit, the injection unit, the drive and the control system. The closure unit includes fixed and movable platens for the mould, an end platen, and tie bars and drive for the movable mould platen (toggle joint or hydraulic closure unit).

An injection unit comprises the electrically heatable barrel, the drive for the screw (motor, gearbox) and the hydraulics for moving the screw and the injection unit. The task of the injection unit is to melt the composition for use in accordance with the invention, especially in the form of pellets, to meter it, to inject it and to maintain the hold pressure (owing to contraction). The problem of the melt flowing backward within the screw (leakage flow) is solved by non-return valves.

In the injection mould, the incoming melt is then separated and cooled, and hence the component to be produced is produced. Two halves of the mould are always needed for this purpose. In injection moulding, the following functional systems are distinguished:

runner system
shaping inserts
venting
machine casing and force absorber
demoulding system and movement transmission
temperature control The special injection moulding methods of GIT (gas injection technology), WIT (water injection technology) and projectile injection technology (PIT) are specialized injection moulding methods for production of hollow workpieces. A difference from standard injection moulding is a specific working step towards the end of the mould filling phase or after a defined partial filling of the casting mould.

In the method-specific working step, a process medium is injected through an injector into the molten core of the preform to form a cavity. This medium is gas—generally nitrogen—in the case of GIT, and water in the case of WIT. In the case of PIT, a projectile is propelled into the molten core and a cavity is formed in this way.

In contrast to injection moulding, extrusion uses a continuous shaped polymer strand, comprising the inventive composition, in an extruder, the extruder being a machine for producing shaped thermoplastics. The following phases are distinguished:
single-screw extruder and twin-screw extruder and the respective sub-groups,
conventional single-screw extruder, conveying single-screw extruder,
contra-rotating twin-screw extruder and co-rotating twin-screw extruder.

Profiles in the context of the present invention are components or parts having identical cross sections over their entire length. They can be produced in a profile extrusion method. The basic method steps in the profile extrusion method are:
1. plasticizing and providing the thermoplastic melt in an extruder,
2. extruding the thermoplastic melt strand through a calibration sleeve having the cross section of the profile to be extruded,
3. cooling the extruded profile on a calibrating table,
4. transporting the profile onward using a draw system beyond the calibration table,
5. cutting the previously continuous profile to length in a cutting system,
6. collecting the profiles which have been cut to length on a collecting table.

A description of the profile extrusion of nylon-6 and nylon-6,6 is given in Kunststoff-Handbuch [Plastics Handbook]3/4, Polyamide [Polyamides], Carl Hanser Verlag, Munich 1998, pages 374-384.

Blow moulding methods in the context of the present invention are preferably standard extrusion blow moulding, 3D extrusion blow moulding, suction blow moulding methods, and sequential coextrusion.

The basic method steps in standard extrusion blow moulding are, according to Thielen, Hartwig, Gust, "Blasformen von Kunststoffhohlkörpern" [Blow Moulding of Hollow Plastics Bodies], Carl Hanser Verlag, Munich, 2006, pages 15 to 17:
1. plasticizing and providing the thermoplastic melt in an extruder,
2. deflecting the melt in a vertical flowing movement in the downward direction and forming a tubular melt "parison",
3. enclosing the suspended parison by means of a mould generally consisting of two half-shells, the blow mould,
4. Inserting a blowing mandrel or one or more blowing pin(s),
5. blowing the plastic parison against the cooled wall of the blow mould, where the plastic cools and solidifies and takes on the ultimate form of the moulding,
6. opening the mould and demoulding the blow-moulded part,
7. removing the pinched-off "flash" wastes at either end of the blow moulding.

Further post-processing steps may follow.

By means of standard extrusion blow moulding, it is also possible to produce products having a complex geometry and multiaxial curvature. In that case, however, products which contain a large proportion of excess, pinched-off material and have a weld seam in large regions are obtained.

In 3D extrusion blow moulding, also referred to as 3D blow moulding, therefore, weld seams are avoided and material use is reduced by using specific devices to deform and manipulate a parison having a diameter matched to the article cross section, and then introducing it directly into the blow mould cavity. The remaining pinch seam is therefore reduced to a minimum at the ends of the article (Thielen, Hartwig, Gust, "Blasformen von Kunststoffholkörpern", Carl Hanser Verlag, Munich 2006, pages 117-122).

In the suction blow moulding method, also referred to as suction blowing, the parison is conveyed directly out of the tubular die head into the closed blow mould and "sucked" through the blow mould by means of an air stream. After the lower end of the parison has emerged from the blow mould, it is pinched off at the top and bottom by means of closure elements, and this is followed by the blowing and cooling procedure (Thielen, Hartwig, Gust, "Blasformen von Kunststoffhohlkörpern", Carl Hanser Verlag, Munich 2006, page 123).

Use

The present application also provides for the use of the inventive compositions as moulding compositions in injection moulding processes, including the special methods of GIT (gas injection technology), WIT (water injection technology) and PIT (projectile Injection technology), in extrusion processes, preferably in profile extrusion, in blow moulding processes, more preferably standard extrusion blow moulding, 3D extrusion blow moulding methods or suction blow moulding methods, in order to produce inventive products therefrom.

The present invention also relates to the use of the inventive compositions for production of products, preferably of electrical components, more preferably of residual current circuit breakers and other circuit breakers, most preferably of circuit breakers having rated currents >16 A, especially preferably circuit breakers having rated currents >32 A, very especially preferably circuit breakers having rated currents >64 A.

EXAMPLES

To demonstrate the improvements in properties described in accordance with the invention, corresponding polymer compositions were first made up by compounding. For this purpose, the individual components according to table 2 were mixed in a twin-screw extruder (ZSK 25 Compounder from Coperion Werner & Pfleiderer (Stuttgart, Germany)) at temperatures between 240 and 280° C., discharged as a strand, cooled until pelletizable and pelletized. After drying (generally for two days at 70° C. in a vacuum drying cabinet), the pellets were processed at temperatures in the range from 240 to 280° C. to give standard test specimens for the respective tests.

The glow wire stability was determined using the GWFI (glow wire flammability index) glow wire test to IEC 60695-2-12 using round blanks having a diameter of 80 mm and a thickness of 0.75 mm.

The charpy impact resistance was determined to ISO 179-1eU on freshly injection-moulded test specimens of dimensions 80 mm·10 mm·4 mm.

Tensile strength, elongation at break and tensile modulus were determined to ISO 527-1/-2 on type 1A dumbbell test specimens (dimensions 170 mm·10 mm·4 mm).

Heat distortion resistance was determined to ISO 75-1,-2 with an applied flexural stress of 1.8 MPa (HDT-A) using test specimens of dimensions 80 mm·10 mm·4 mm.

Shrinkage during processing was determined, in parallel and transverse to injection direction in each case, to ISO 294-4 using test specimens of dimensions 60 mm·60 mm·2 mm at a melt temperature of 260° C. and a mould temperature of 80° C. at hold pressure 600 bar.

Subsequently, as a measure of isotropy, warpage was calculated as the quotient of shrinkage during processing parallel to injection direction and shrinkage during processing transverse to injection direction. Values above 0.8 for the isotropy thus calculated suggest low-warpage materials.

For example, a commercial nylon-6 having 30% by weight of glass fibres has shrinkage during processing of 0.3%/0.7% [parallel/transverse], which then leads to an isotropy value of only 0.4 according to the above formula and thus means severe warpage.

The particle size of the ground glass particles (component B)) was determined by a laser optics method ("Eye Tech") from Ankersmid Ltd, Oosterhout, The Netherlands in a cell of the "ACM-104 Liquid Flow (4×4 mm)" type. The measurement time was about 900 sec. The evaluation relates to the surface area of the glass particles.

The following were used in the experiments:
Component A): nylon-6 (Durethan® B26, from Lanxess Deutschland GmbH, Cologne, Germany) [CAS No. 25038-54-4]
Component A'): nylon-6,6 (Zytel® 101 NC010 (from Dupont, Wilmington, USA)) [CAS No. 32131-17-2]
Component B): MF7900 from Lanxess Deutschland GmbH, Cologne, Germany [a non-fibrous and non-foamed ground glass based on E Glass, containing about 0.1% by weight of triethoxy(3-aminopropyl) silane size B') having a d90 of 54 μm, a d50 of 14 μm, a d10 of 2.4 μm and a median particle size of 21 μm, based in each case on the particle surface area].
Component C): CS 7997 chopped glass fibres from Lanxess Deutschland GmbH, Cologne, Germany [median fibre diameter 10 μm, median fibre length 4.5 mm, E glass]
Component D): melamine cyanurate [CAS No. 37640-57-6](Melapur® MC25, from BASF, Ludwigshafen, Germany)
Component E): titanium dioxide [CAS No. 13463-67-7] (Kronos 2230, from Kronos, Dallas, USA)
Component H): ethylenebisstearylamide [CAS No. 110-30-5] in the form of Loxiol® EBS from Emery Oleochemicals
Component L): Lowinox® HD 98-50 D-TDS, 3,3'-bis(3,5-d-tert-butyl-4-hydroxyphenyl)-N,N'-hexamethylenedproplonamide [CAS No. 23128-74-7]

TABLE 2

| Components | | 1 | 2 | 3 | 4 | 5 |
|---|---|---|---|---|---|---|
| A | [%] | 74.6 | 69.6 | 69.1 | — | — |
| A' | | — | — | — | 63.6 | 66.1 |
| B | [%] | 16 | 21 | 19 | 21 | 21 |
| C | [%] | 3 | 3 | 5 | 4 | 4 |
| D | [%] | 4 | 4 | 4.5 | 9 | 6.5 |
| E | [%] | 2 | 2 | 2 | 2 | 2 |
| H | [%] | 0.2 | 0.2 | 0.2 | 0.2 | 0.2 |
| L | [%] | 0.2 | 0.2 | 0.2 | 0.2 | 0.2 |
| GWFI (0.75 mm) | [° C.] | 960 | 960 | 960 | 960 | 960 |
| HDT A | [° C.] | 134 | 140 | 163 | 142 | 143 |
| CHARPY | [kJ/m²] | 28 | 31 | 26 | 37 | 33 |

TABLE 2-continued

| Components | | 1 | 2 | 3 | 4 | 5 |
|---|---|---|---|---|---|---|
| Shrinkage during processing [%] (parallel) | | 0.76 | 0.66 | 0.64 | 0.96 | 1.21 |
| Shrinkage during processing [%] (transverse) | | 0.75 | 0.70 | 0.77 | 1.04 | 1.2 |
| Isotropy [parallel/transverse] | | 101 | 0.94 | 0.83 | 0.92 | 1.01 |
| Tensile strength | [MPa] | 72 | 70 | 85 | 76 | 78 |
| Elongation at break | [%] | 3.1 | 2.9 | 3 | 2.6 | 2.9 |
| Tensile modulus | [MPa] | 4179 | 4514 | 5322 | 5257 | 5182 |

Values for the components in % by weight are based on the overall moulding composition.

The examples in Table 2 show that Inventive Examples 1 to 5, both for nylon-6 and nylon-6,6, attained the maximum temperature of 960° C. in the glow wire test even in the case of test specimens of thickness only 0.75 mm, at the same time had a very low tendency to warpage with an isotropy above 0.8, and nevertheless had heat resistances to HDT-A above 130° C.

What is claimed is:
1. A composition comprising:
A) 5% to 92.8% by weight of nylon-6 or nylon-6,6,
B) 5% to 80% by weight of non-fibrous and non-foamed ground glass having a d90 of 5 μm to 250 μm,
C) 2% to 8% by weight of glass fibres,
D) 0.1% to 40% by weight of melamine cyanurate, and
E) 0.1% to 10% by weight of titanium dioxide,
with the proviso that the sum total of all the percentages by weight is always 100%.
2. The composition according to claim 1, wherein component B) is optionally sized with at least one aminoalkyltrialkoxysilane, in amounts of 0.01% by weight to 1.5% by weight, based on the amount of the non-fibrous and non-foamed ground glass.
3. The composition according to claim 1, wherein the non-fibrous and non-foamed ground glass has a particulate, non-cylindrical form with a width to thickness ratio of less than 5.
4. The composition according to claim 3, wherein the non-fibrous and non-foamed ground glass has a density of 2400 kg/m³ to 2700 kg/m³.
5. The composition according to claim 4, wherein the non-foamed and non-fibrous ground glass does not exhibit the glass geometry typical of fibrous glass with a cylindrical or oval cross section having a length to diameter ratio (L/D ratio) of greater than 5.
6. The composition according to claim 5, wherein the non-fibrous and non-foamed ground glass comprises at least one of soda-lime glass, borosilicate glass, A Glass or E Glass.
7. The composition according to claim 6, wherein the non-fibrous and non-foamed ground glass comprises glass types in which the K₂O content is less than or equal to 2% by weight, based on all the components of the glass.
8. The composition according to claim 3, wherein the width to thickness ratio is less than 2.
9. The composition according to claim 6, wherein the non-fibrous and non-foamed ground glass comprises E glass.
10. A composition comprising:
A) 30% to 80% by weight, of nylon-6,
B) 15% to 50% by weight, of a non-fibrous and non-foamed glass having a d90 determined by laser diffractometry in the range from 16 to 25 μm,

C) 4% to 6% by weight, of glass fibres,
D) 1% to 20% by weight, of melamine cyanurate,
E) 1% to 2% by weight, of titanium dioxide, and
H) 5% to 25% by weight, of ethylenebisstearylamide,
with the proviso that the sum total of all the percentages by weight is always 100%.

* * * * *